June 29, 1943.  W. W. MEYER  2,322,867
SEAL
Filed Jan. 10, 1941
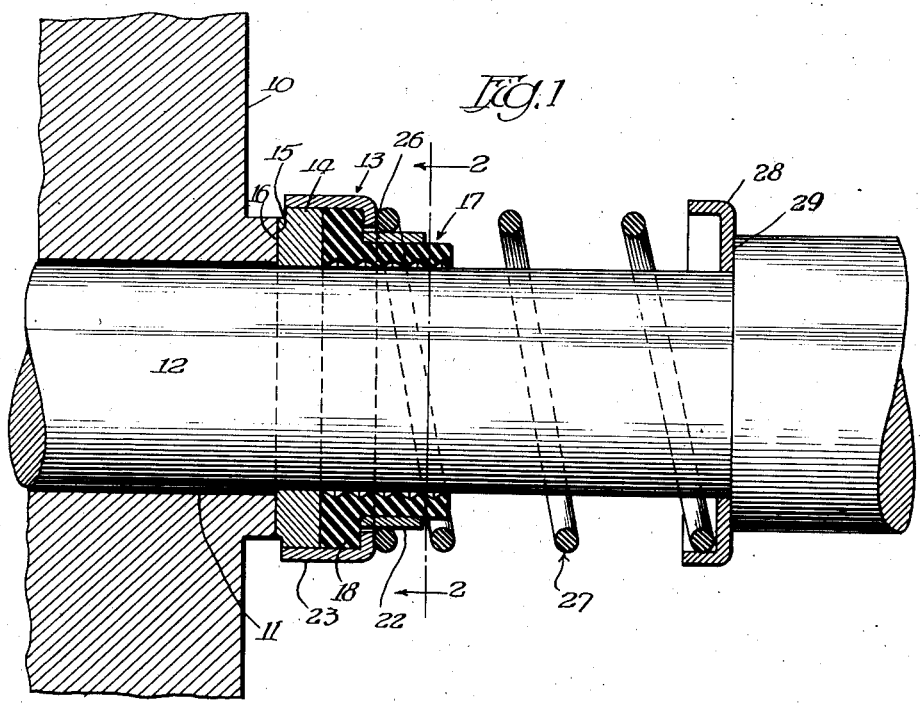
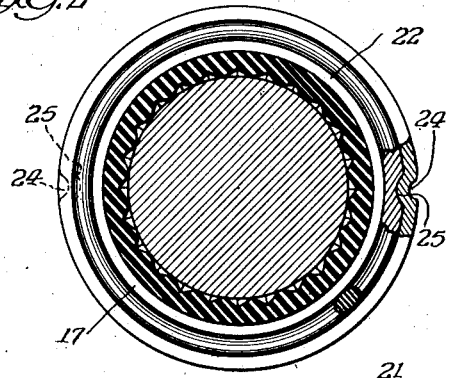
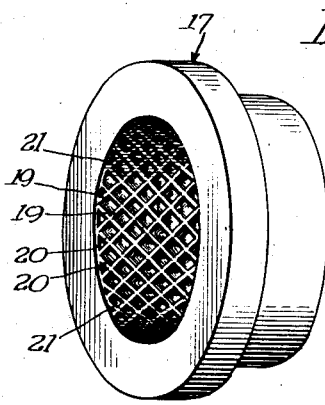
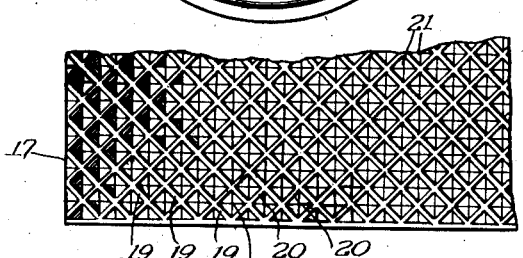
Inventor
Walter W. Meyer
By Spencer, Marzall, Johnston & Cook
Attys

UNITED STATES PATENT OFFICE 2,322,867

SEAL

Walter W. Meyer, Arlington Heights, Ill., assignor to Rotary Seal Company, Chicago, Ill., a corporation of Illinois Application January 10, 1941, Serial No. 373,889

2 Claims. (Cl. 286—7)

This invention has to do with a seal disposable about rotary shafting or the like, and relates more particularly to a seal for preventing the leakage of gas or other fluid axially along and between a shaft and an opening therefor within an enclosure wall. The invention is especially useful in the mechanical refrigeration art where seals are required in association with a rotary shaft that drives a refrigerant compressor unit, though not restricted to this field.

Seals of the general character herein disclosed include a sealing ring placed about a rotatable shaft and having upon one end thereof a smooth annular face in sliding relation with a complemental smooth face upon a wall such as that of a crank case in which the shaft is journalled. As the ring rotates with the shaft the smooth sliding faces effect a hermetic seal preventing the passage between them of compressed gas from within the crank case.

The opposite end of the sealing ring is sealed and drivingly connected with the shaft by means of a compressible resilient gasket, such end of the ring usually being cupped or recessed to receive the gasket. It is also usual to provide, about the shaft, a helical spring with an end exerting an axial thrust against the gasket. In the operation of this prior art structure the gasket transmits the spring's force to the sealing ring to maintain the sliding sealing faces together, and it is intended that the gasket will yield and slide along the shaft sufficiently to cause substantially uniform application of this force to the sealing ring and hence effect a constantly firm leak-proof engagement between said faces despite relative axial movement and/or wobble of the shaft and the casing wall that may be caused by slight inaccuracies in the apparatus.

However, the applicant has found that after these contemporary seal structures have been in service for a while they develop leaks, and one cause of this leakage has been traceable to a permanent seal or adherence of the inner periphery of the gasket upon the shaft whereby the gasket is trammelled in its axial displacement and compressibility so that the spring is no longer effective for pressing the sliding sealing face of the sealing ring against its complemental face at all times during operation of the apparatus. One object of the present invention is the provision of an improved compressible resilient gasket member having upon its inner periphery a network of ribs defining therebetween a plurality of recesses which overcome this tendency for the gasket to "freeze" or permanently stick to the shaft. These recesses prevent the existence of a continuous evacuated juncture between the gasket and the shaft and also provide spaces into which the body of said gasket is displaceable incident to the application of an axial force thereto and thus assure the availability of relative axial movement between said gasket and the shaft at all times.

Another object of this invention is the provision of a gasket as the above wherein the rib network is of a character providing sufficient frictional contact with the shaft for causing the gasket to rotate with the shaft.

Another object is the provision of a novel sleeve-like gasket having a ribbed interior and an integral radially outwardly projecting flange upon an end portion thereof.

A further object is the provision of a sleeve-like compressible resilient gasket member having a ribbed inner periphery and a freely mounted retaining band encircling its outer periphery.

A still further object of this invention is the provision of a novel seal structure having a sealing ring with an annular sealing face upon one end thereof, a compressible resilient sleeve-like gasket having a radially outwardly projecting flange at an end portion adjacently to the opposite end of said ring, a coupling ring encircling the flange and having a radially inturned portion disposed in overlapping relation with the side of the flange opposite to the sealing ring, the coupling ring having a driving connection with the sealing ring that permits of relative axial movement between said rings, and the inturned portion of the coupling ring being suited for the seating thereon of means for exerting an axial force upon said coupling ring and the transmission of that force through the resilient flange to the sealing ring.

These and other desirable objects encompassed by and inherent to the invention will later become apparent.

Referring to the drawing—

Fig. 1 is a fragmentary view, partly in section, illustrating a preferred embodiment of the invention installed upon a shaft journalled within an enclosure wall;

Fig. 2 is a transverse sectional view taken substantially on the line 2—2 of Fig. 1, parts being broken away for clarity;

Fig. 3 is a perspective view of a gasket constructed according to the present invention, this view illustrating a form of rib network upon the inner periphery of the gasket; and Fig. 4 is a fragmentary development view illustrating the rib structure or network upon the interior of the gasket shown in the lower numbered figures.

With further reference to the drawing, wherein the same reference characters appearing in different figures designate the same respective parts, and particularly to Fig. 1, there is shown a portion of a wall 10 having an opening 11 which in the present structure serves as a bearing for a rotatable shaft 12. The seal which is generally designated 13 is for preventing the leakage of gas or other fluid from a space on the right side of the wall 10, where it is confined under pressure, into and along the interstice between the shaft 12 and the opening or bearing 11 to the left side of the wall 10 where the ambient pressure is relatively less.

In the structure of my improved seal I provide a seal ring 14 preferably made of a metal and having upon its left end a smooth flat annular face 15 which is slidable upon a complemental face 16 formed upon the wall 10. Adjacently to the seal ring 14 there is placed about the shaft 12 a sleeve-like gasket member 17, also shown in Figs. 2, 3 and 4, which is made of a tough compressible resilient material such as rubber, "Neoprene" or other rubber substitute. Upon the left end portion of the sleeve-like gasket 17 there is formed a radially outwardly projecting flange 18 which abuts against the ring 14 in both sealing and driving relation; that is, the frictional engagement between the abutting end faces of the parts 14 and 18 is such that rotative driving force is impartible from the member 18 to the member 14. A plurality of sets of intersecting ribs 19 and 20 are formed upon the inner periphery of the gasket 17, the ribs 19 of one set running helically in one direction and the ribs 20 of another set running helically in the opposite direction. The resulting network of these ribs effects a myriad of isolated diamond-shaped recesses 21, plainly illustrated in Figs. 3 and 4. The breadth, spacing and pitch of the ribs is so chosen that at any circumferential section of the gasket there will be a plurality of the recesses 21 arranged axially of said gasket.

A confining or reinforcing band 22, preferably of metal, is placed about the main body or sleeve-like portion of the gasket 17, whereas a coupling ring 23 is placed circumferentially about the ring 14 and the flange 18. In the left-hand portion of the ring 23 there are formed diametrically opposite indentational bosses 24 that are meshed with axial grooves 25 in the outer periphery of the ring 14; see Fig. 2. This arrangement enables the seal ring 14 to be rotatively driven from the coupling ring 23 while permitting of relative axial movement between these two members.

The right end of the coupling ring 23 is bent radially inwardly in overlapping relation with the right end of the flange 18 and thus forms a seat 26 for one end of a helical spring 27 of which the opposite end seats within a cup 28 that bears against a shoulder 29 of the shaft 12.

In the operation of my improved device, during rotation of the shaft 12, the spring 27 exerts sufficient axial force against the seat 26 to partially compress the resilient flange 18, and the reaction of this flange against the seal ring 14 causes the face 15 of said ring to be pressed firmly against the wall face 16. Thus the contiguous ends of the flange 18 and of the ring 14 are maintained in sealing relationship and said flange 18 is clamped between the seat 26 and the ring 14 so that rotative force imparted from the shaft 12 to the gasket 17 will be transmitted from the flange 18 to the rings 23 and 14 which, it will be recalled, are coupled for mutual rotation by means of bosses 24 and the notches 25. While some rotative force will be transmitted from the shaft 12 to the rings 13 and 14 through the spring cup 28 and the spring 27, it is also desirable that this force be augmented by force transmitted from the shaft through the gasket 17.

The rib network herein disclosed has been found to provide sufficient contacting area upon the shaft 12 and in such a manner that the desired amount of rotative force is transmitted from the shaft to the gasket, though insufficient force would be transmitted to the gasket if the ribs therein were simply parallel circumferential ribs. Consequently the sealing ring 14 will be caused to rotate with the shaft 12 while sliding the sealing surface 15 about the complemental sealing surface 16 whereby leakage radially inwardly along the left end of the ring 14 to the right end of the bearing 11 is prevented. Leakage radially inwardly along the right end of the ring 14 is precluded by the contiguous sealing relation of the flange 18, and leakage between the gasket 17 and the shaft 12 is precluded by the ribs 19 and 20, the effectiveness of these ribs being augmented by the isolated pockets or recesses between them.

Oftentimes, because of improper alignment of the shaft 12 or parts with which it is associated, or, because of tortional vibration of this shaft under load, relative axial or wobble movement will be incurred between said shaft and the part as 10 upon which there is provided the complemental sealing face 16. When this occurs the flange 18 will yield fluctuatively under the force of the spring 27 and the reactive force of the face 16 whereby the inner periphery of the sleeve will be reciprocated axially upon the shaft. The ribs arranged as herein shown, while effecting sufficient frictional engagement with the shaft 12 to cause the gasket to rotate therewith, avoid sticking to the shaft with the extreme tenacity that would interfere with the aforesaid reciprocal movement along said shaft. This is a pronounced improvement over previous gaskets which "freeze" to the shaft and thus interfere with compressions of the gasket by the spring.

The sleeve portion of the gasket is reinforced by the ring 22, which, being separate from the coupling ring 23, causes unitary movement of such sleeve portion with but limited distortion whereby the efficient association of the ribs 19 and 20 with the shaft is preserved.

While I have herein shown and described but one specific embodiment of my improved seal structure, it should be understood that the invention extends to other arrangements, details and structures falling within the spirit thereof.

The invention is hereby claimed as follows:

1. A seal for rotating arbors comprising a seal ring adapted to have a free sliding rotary fit against means forming a circular seal seat through which the arbor extends, a flexible seal member of rubber-like material having a sleeve-like portion providing a surface for sealing engagement about the arbor to prevent the escape of gas or fluid along the surface of the arbor, the seal member also having sealing engagement with the seal ring, the sleeve-like portion of the seal member being formed with a plurality of crossing ribs in the arbor engaging surface thereof, including ribs extending in one helical direction on said arbor engaging surface, and intersecting ribs extending in another helical direction, said crossing ribs providing air spaces between the ribs to permit the seal member to adhere to the arbor tightly enough to form a seal therewith and drive the seal member with the arbor while allowing axial movement of the sleeve-like portion along the arbor to compensate for wear, inaccuracy and the like in the seal ring.

2. A seal for rotating arbors comprising a seal ring adapted to have a free sliding rotary fit against means forming a circular seal seat through which the arbor extends, a flexible seal member of rubber-like material having a sleeve-like portion providing a surface for sealing engagement about the arbor to prevent the escape of gas or fluid along the surface of the arbor, a spring member adapted to urge the seal member into cooperative engagement with the seal ring, the seal member also having sealing engagement with the seal ring, the sleeve-like portion of the seal member being formed with a plurality of crossing ribs in the arbor engaging surface thereof, including ribs extending in one helical direction on said arbor engaging surface, and intersecting ribs extending in another helical direction, said crossing ribs providing air spaces between the ribs to permit the seal member to adhere to the arbor tightly enough to form a seal therewith, the parts being so arranged and conformed and adapted to operate that the seal member and the seal ring will rotate with the arbor without substantial slipping therebetween and an axial creepage of the seal member on the arbor without impairment of the seal may occur.

WALTER W. MEYER.